United States Patent [19]

Swanhart et al.

[11] Patent Number: 4,893,746

[45] Date of Patent: Jan. 16, 1990

[54] COLLAPSIBLE, REUSABLE SHIPPING CONTAINER

[75] Inventors: David E. Swanhart, Trenton; Carl A. Angelini, Spring Lake, both of N.J.

[73] Assignee: Trent Box Manufacturing Co., Inc., Trenton, N.J.

[21] Appl. No.: 309,529

[22] Filed: Feb. 13, 1989

[51] Int. Cl.⁴ .............................................. B65D 88/52
[52] U.S. Cl. .................................. 229/23 R; 206/600; 220/1.5; 220/6; 220/7; 229/122
[58] Field of Search ............ 229/23 R, 122; 206/386, 206/597, 600; 220/1.5, 6, 7; 108/55.1, 55.5, 56.1

[56] References Cited

U.S. PATENT DOCUMENTS

| | | | |
|---|---|---|---|
| Re. 16,509 | 12/1926 | Burkholder | 229/46 |
| 763,142 | 6/1904 | Bisler | 229/41 R |
| 1,160,871 | 11/1915 | Forward | 229/50 |
| 1,221,900 | 4/1917 | Palmer | 229/6 R |
| 1,307,638 | 6/1919 | Pridham | 229/41 B |
| 1,420,148 | 6/1922 | Rock | 229/23 |
| 1,468,229 | 9/1923 | Elliott | 229/44 R |
| 1,906,964 | 5/1933 | Hill | 229/37 R |
| 2,374,539 | 4/1945 | Guyer | 229/23 C |
| 2,447,677 | 8/1948 | Williams | 229/23 R |
| 2,581,105 | 1/1952 | Hunsworth | 229/23 R |
| 2,656,089 | 10/1953 | Fallert et al. | 229/23 R |
| 2,761,609 | 9/1956 | Arkin | 229/41 B |
| 2,962,203 | 11/1960 | Fallert | 229/41 B |
| 2,990,951 | 7/1961 | Fallert | 206/597 |
| 3,003,680 | 10/1961 | Wilcox, Jr. | 229/41 |
| 3,119,545 | 1/1964 | Gullikson | 229/16 |
| 3,126,140 | 3/1964 | Lizan et al. | 229/16 |
| 3,214,076 | 10/1965 | Gagnon | 229/23 R |
| 3,542,637 | 11/1970 | Zoia | 229/45 |
| 3,667,666 | 6/1972 | Pryor | 229/16 |
| 3,746,203 | 7/1973 | Cipolla | 220/6 |
| 3,949,929 | 4/1976 | Kupersmit | 206/600 |
| 3,966,075 | 6/1976 | Schultz | 220/1.5 |
| 4,094,458 | 6/1978 | Nelson, Jr. | 229/41 B |
| 4,167,242 | 9/1979 | Kupersmit | 229/45 R |
| 4,508,237 | 4/1985 | Kreeger et al. | 220/6 |
| 4,589,588 | 5/1986 | Swanhart | 229/41 R |

FOREIGN PATENT DOCUMENTS

| | | |
|---|---|---|
| 1471597 | 1/1967 | France . |
| 160605 | 3/1933 | Switzerland . |
| 25995 | of 1907 | United Kingdom . |
| 2123789 | 2/1984 | United Kingdom . |

*Primary Examiner*—Gary Elkins
*Attorney, Agent, or Firm*—Sperry, Zoda & Kane

[57] ABSTRACT

An improved collapsible, reusable shipping container is disclosed which is particularly usable for transportation of freight by air which is formed of a paperboard material having a high strength-to-weight ratio which is covered with a moisture sealing external coating to minimize weather damage thereto. The container is fully collapsible and includes door panels easily opened and closed to facilitate placement and removal of baggage or other cargo articles therein. An arcuate roof structure is provided to minimize the possibility of puddling or other such water damage to the top surface of the housing. The container can include one or two sets of doors which overlap one another and are retained from outward movement by vertically extending retaining straps when the container is in the loaded configuration.

17 Claims, 1 Drawing Sheet

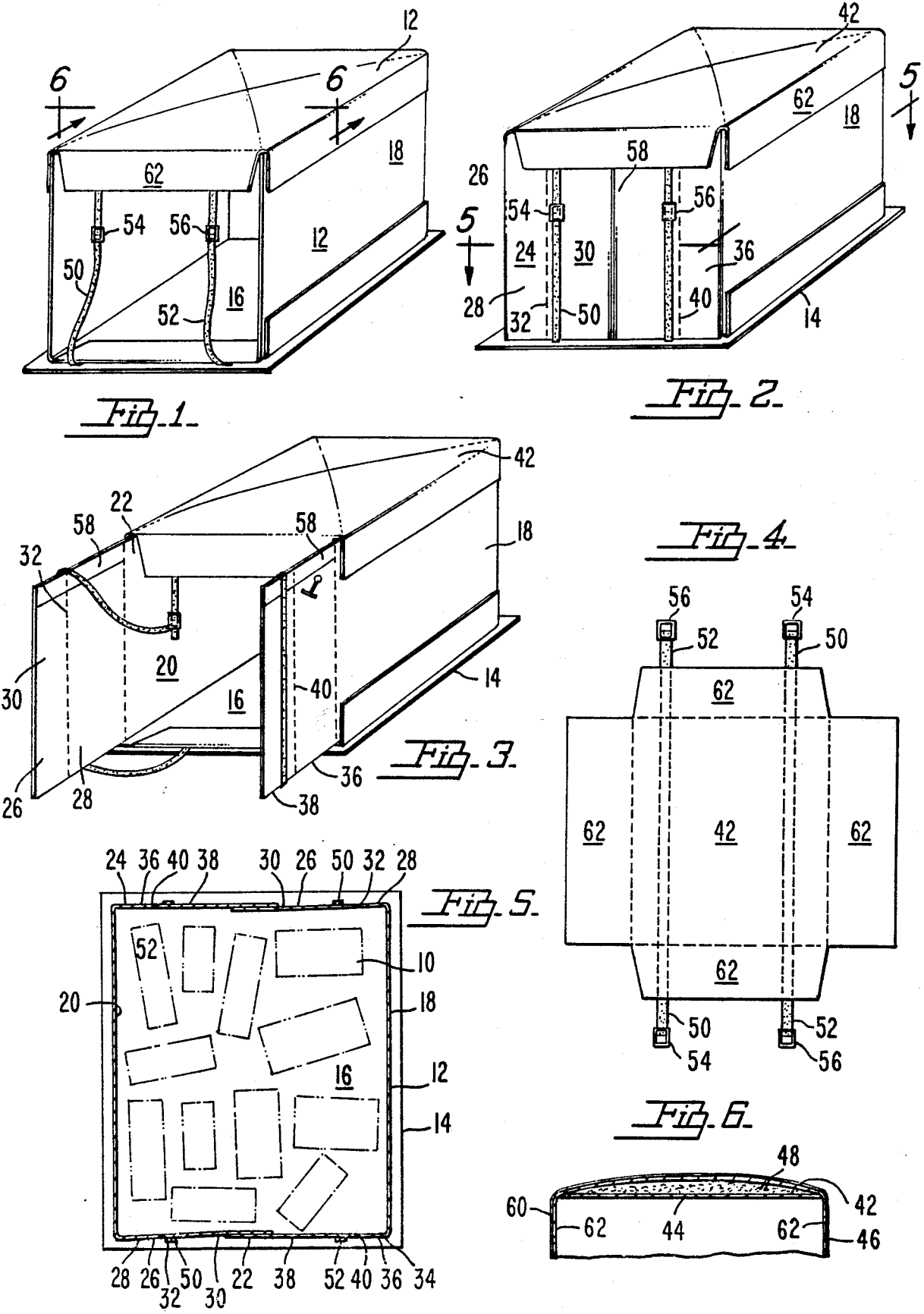

COLLAPSIBLE, REUSABLE SHIPPING CONTAINER

BACKGROUND OF THE INVENTION

1. Field Of The Invention

The present invention deals with the field of devices which are designed to retain cargo articles therein which are relatively lightweight and yet of relatively high strength. These containers are preferably collapsible and are designed for reuse rather than discarding as is the case normally with paperboard containers. Such containers are particularly usable for carrying air freight wherein weight requirements and strength requirements are quite stringent.

2. Description Of The Prior Art

Prior art devices for similar configurations are shown in U.S. Pat. Nos. 16,509 issued 12/1926 to Burkholder; 763,142 issued 6/1904 to Bisler; 1,160,871 issued 11/1915 to Forward; 1,221,900 issued 4/1917 to Palmer; 1,307,638 issued 6/1919 to Pridham; 1,420,148 issued 6/1922 to Rock; 1,468,229 issued 9/1923 to Elliott; 1,906,964 issued 5/1933 to Hill; 2,374,539 issued 4/1945 to Guyer; 2,761,609 issued 9/1956 to Arkin; 2,962,203 issued 11/1960 to Fallert; 3,003,680 issued 10/1961 to Wilcox, Jr.; 3,119,545 issued 1/1964 to Gullikson; 3,126,140 issued 3/1964 to Lizan et al; 3,542,637 issued 11/1970 to Zoia; 3,667,666 issued 6/1972 to Pryor; 3,746,203 issued 7/1973 to Cipolla; 3,966,075 issued 6/1976 to, Schultz; 4,094,458 issued 6/1978 to Nelson, Jr.; 4,167,242 issued 9/1979 to Kupersmit; 4,508,237 issued 4/1985 to Kreeger et al; 4,589,588 issued 5/1986 to Swanhart; and foreign patents No. 1471597 (France) issued 1/1967; 160605 (Switzerland) issued 5/1933; 25995 (United Kingdom) issued in 1907; and 2,123,789 (United Kingdom) issued 2/1984.

SUMMARY OF THE INVENTION

The present invention provides an improved collapsible, reusable shipping container which is particularly usable for carrying aircraft cargo which includes housing mean, top means, and bottom means formed preferably of a paperboard material which is coated to facilitate strength and to minimize weight and to minimize weather damage or moisture damage thereto. The housing defines a containment chamber therein for holding cargo articles. The housing means includes a base member including a floor extending generally horizontally and a side wall means extending upwardly from the base member to define inwardly facing inner wall means and defining door opening means. At least one and perhaps two such door opening means can be defined by the side walls.

A door means is positioned selectively extendable over the door opening means and includes a first door member attached with respect to the side wall means adjacent the door opening means and being laterally pivotally movable with respect to the side wall. The first door is selectively positionable extending across at least one half of the door opening means and includes a first inner door panel extending vertically adjacent the side wall means and a first outer door panel extending vertically adjacent the first inner door panel spatially disposed from the side wall means. These two vertically extending panels are pivotally movable with respect to one another along a first crease formed in the door material therebetween.

In a similar fashion a second door member can be attached with respect to the side wall adjacent the door opening such that it is selectively positionable extending across the other half of the door opening at least partially overlapping the first door member. This second door member is configured to include a second inner door panel extending vertically adjacent the side wall and a second outer door panel extending vertically adjacent the first inner door panel spatially disposed from the side wall and at least partially overlapping the first outer door panel. Preferably a second crease will extend vertically along the second door between the second inner door panel and the second outer door panel to facilitate flexible pivotal movement of each door panel with respect to one another.

A top means may extend across the housing and may include a base layer and an outside layer and a top filler means positioned therebetween. The top filler means is preferably thinner in the outer area of the top adjacent the side walls and thicker in the inner area thereof to provide a concave arcuate profile to the outside layer of the top to facilitate drainage of water thereoff and minimize the possibility of puddling of water in the roof area. The top filler material itself is preferably of a lightweight material to allow for a maximum convex profile of the roof while still providing a lightweight roof structure.

A first end strap may extend from the top means downwardly to the base member across the first outer door panel of the first door member and a second end strap may extend from the top means downwardly to the base member across the second outer door panel of the second door member. These end straps are positioned extending across the outer door panels of the first and second door members to facilitate retaining of the doors in place when the housing means is loaded with cargo articles. The outward bias exerted by the cargo articles will urge the first and second door means outwardly into abutting contact with the end straps to facilitate interlocking thereof.

The housing can include a front and rear door opening with two sets of doors if desired and the exterior surface of the container is preferably coated with a moisture sealing material such as a wax coating. A lighter weight coating can also be applied to the inner surface of the container to further minimize the possibility of moisture damage thereto.

The strap means are preferably of polypropylene and include a buckle member along each such strap to facilitate locking and unlocking of the door means as selectively desired. An edge sealing means may extend across the upper edges of the doors to minimize the possibility of moisture entering the doors along the upper edge and compromising the retainment strength of those doors. To further add strength to the design a rigid base member or floor can be configured of plywood or other such rigid material to provide base strength and support strength for articles retained therein.

Weight is of particular significance to the reusable shipping containers when used in airlines. Airlines regard fuel consumption rates to be critical in order to minimize operating costs and for general fuel efficiency. The present invention provides a container weighing only one hundred pounds rather than aluminum containers which can weigh two to three times as much. Usage of a plurality of these containers can result in substantial weight savings. These containers are also usable many times for as many as thirty or more flights. These containers are also particularly usable for outdoor storage due to the arcuate roof structure and the sealed external surfaces extending therearound.

It is an object of the present invention to provide an improved collapsible, reusable shipping container particularly usable for carrying aircraft cargo, wherein high container strength and low container weight are achieved.

It is an object of the present invention to provide an improved collapsible, reusable shipping container particularly usable for carrying aircraft cargo, wherein moisture is repelled from the exterior and interior surfaces of the paperboard shipping container by means of a wax coating thereon.

It is an object of the present invention to provide an improved collapsible, reusable shipping container particularly usable for carrying aircraft cargo, wherein an arcuate roof is provided to provide a pitched outer surface to facilitate drainage of moisture thereoff.

It is an object of the present invention to provide an improved collapsible, reusable shipping container particularly usable for carrying aircraft cargo, wherein a simple construction utilizing two exteriorly positioned belts are included to retain doors from opening during shipment.

It is an object of the present invention to provide an improved collapsible, reusable shipping container particularly usable for carrying aircraft cargo, wherein edge sealing can be applied along vertically extending edges to minimize entry of moisture therein.

It is an object of the present invention to provide an improved collapsible, reusable shipping container particularly usable for carrying aircraft cargo, wherein straps of polypropylene extend about the container to facilitate locking of the doors thereof.

It is an object of the present invention to provide an improved collapsible, reusable shipping container particularly usable for carrying aircraft cargo, wherein a rigid base surface is provided which allows the unit to be capable of being moved by a conventional forklift.

It is an object of the present invention to provide an improved collapsible, reusable shipping container particularly usable for carrying aircraft cargo, wherein lightweight inexpensive paperboard can be used as a reusable container for air cargo shipments.

It is an object of the present invention to provide an improved collapsible, reusable shipping container particularly usable for carrying aircraft cargo, wherein maintenance is minimized.

It is an object of the present invention to provide an improved collapsible, reusable shipping container particularly usable for carrying aircraft cargo, wherein initial capital costs of the container is minimized.

It is an object of the present invention to provide an improved collapsible, reusable shipping container particularly usable for carrying aircraft cargo, wherein a self-contained collapsed air container can be expanded to full operating configuration within ten to fifteen seconds without the use of tools or separate assembly devices or other hardware.

It is an object of the present invention to provide an improved collapsible, reusable shipping container particularly usable for carrying aircraft cargo, which minimizes flight delays by providing a readily available supply of collapsible containers which can be particularly used during peak use times when the aluminum containers have been completely utilized.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a front perspective view of an embodiment of the collapsible, reusable shipping container of the present invention shown with the doors in the closed position;

FIG. 2 is an illustration of the embodiment shown in FIG. 1 with the doors shown in the closed and retained position;

FIG. 3 is an illustration of the embodiment shown in FIG. 1 with the doors shown in the outer opened position;

FIG. 4 is a top plan view of an embodiment of the top means of the present invention;

FIG. 5 is a cross section of FIG. 2 along lines 5—5; and

FIG. 6 is a cross section of the top means of FIG. 1 along lines 6—6.

DETAILED DESCRIPTION OF THE PREFERRED EMBODIMENT

The present invention provides an improved collapsible, reusable shipping container adapted to carry cargo articles 10 within a housing means 12 defined between a base member 14 and a plurality of side wall means 18. The base member 14 may preferably include a floor 16 of a rigid material such as plywood whereas the side walls, doors and top sections are all formed of wax coated paperboard material.

The housing means 12 defines a cargo retainment chamber therein and the side wall means 18 provide inner wall means 20 facing inwardly for retaining of the cargo articles 10.

Door opening means 22 are defined in at least one location along the side wall means 18 and a plurality of door means 24 are adapted to be selectively positionable extending thereover for alternatively allowing loading, unloading or retainment of airborne cargo articles 10 therein.

A first door member 26 extends across door means 24 and a second door member 34 also extends across door means 24 each being pivotally secured with respect to the side wall means thereadjacent and adapted to overlap one another to seal off the door opening means 22 adjacent door means 24.

In specific configuration preferably the first door member 26 includes a first door inner panel 28 and a first door outer panel 30 both extending longitudinally and being pivotally movable with respect to one another by way of a first door crease 32 extending vertically therebetween. In a similar fashion the second door member 34 preferably includes a second door inner panel 36 and a second door outer panel 38 each being pivotally secured with respect to one another by way of a second door crease 40 extending vertically therebetween.

A top means 42 preferably extends over the housing means 12 to facilitate protection of cargo articles 10 located therein. Top means 42 preferably includes a base layer 44 and an outside layer 46 as well as a top filler means 48 positioned between the base layer 44 and the outside layer 46. Top filler means 48 preferably is thicker in the central location of the top means 42 and is thinner in the outer areas adjacent the side wall means 18 to thereby provide a slightly convex profile to the outside layer 46 to allow water and other elements to be repelled thereoff.

It is preferable that the housing means including the side wall means as well as the door means and the top means are all formed of a paperboard material which is lightweight and yet of great strength. This paperboard material can be made reusable for many times by the inclusion of a moisture repelling wax coating 60 extending over the outer surface thereof. Preferably the wax coating 60 may also extend across the inner surface but perhaps to a lighter degree to further extend the number of times that the reusable paperboard containers can be actually reused.

A first end strap means 50 preferably of a polypropylene material extends downwardly over the first door member 26 and particularly over the first door outer panel 30 thereof. In a similar fashion the second end strap means 52 preferably of a polypropylene material extends downwardly across the second door outer panel 38 of second door member 34. In this manner first door member 26 and second door member 34 will be prevented from outer movement when cargo articles 10 are positioned therein. This retained position is achievable by securement of the first end strap buckle means 54 and the second end strap buckle means 56 after the housing 12 is loaded with cargo articles 10 and after the first and second door members 26 and 34 are closed. Outward pressure will be exerted by the cargo on the door members which will place tension upon the first and second end strap buckle means 54 and 56 thereby facilitating firm securement of the doors in the closed position until opening is desired. Opening can be facilitated when desired easily by merely release of the buckle means 54 and 56.

To minimize the possibility of moisture entering the doors an edge sealing means 58 may extend along the upper edge of the doors in the form of a water repelling tape or the like to prevent deterioration of the door structures. Furthermore to minimize the possibility of entry of any water into the side walls 18 of housing 12 the top means may include a plurality of end flaps 62 which extend over the side walls and also over the door means 24 when desired to minimize entry of water into the upper edges thereof.

The present invention provides a paperboard air shipment container of great strength which is collapsible and can be assembled and collapsed in as little as ten seconds. The wax coating on the outer and possibly inner surface of the paperboard minimizes moisture damage and the convex roof structure made possible by the lightweight filler material placed therein also minimizes weather damage.

The capability of moving such paperboard boxes with a forklift is a distinct advantage made possible by the configuration of the floor 16 as a plywood material. In this manner such paperboard reusable shipping containers can be used virtually in the same manner as their aluminum counterparts which are extremely more expensive.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An improved collapsible, reusable shipping container being particularly usable for carrying aircraft cargo, which comprises:
   (a) a housing means defining a containment chamber therein for holding articles, said housing means comprising:
      (1) a base member comprising a floor extending generally horizontally;
      (2) a side wall means extending upwardly from said base member to define inwardly facing inner wall means and defining door opening means;
   (b) a door means positioned selectively extendable over said door opening means and including:
      (1) at least one first door member attached with respect to said side wall means adjacent said door opening means and selectively positionable extending across at least one half thereof, said first door member including:
         (a) a first inner door panel extending vertically adjacent said side wall means;
         (b) a first outer door panel extending vertically adjacent said first inner door panel spatially disposed from said side wall means;
      (2) at least one second door member attached with respect to said side wall means adjacent said door opening means and selectively positionable extending across the other half of said door opening means and at least partially overlapping said first door member, said second door member including;
         (a) a second inner door panel extending vertically adjacent said side wall means;
         (b) a second outer door panel extending vertically adjacent said first inner door panel spatially disposed from said side wall means and at least partially overlapping said first outer door panel;
   (c) a top means extending across said housing means and including:
      (1) a base layer;
      (2) an outside layer;
      (3) a top filler means positioned between said base layer and said outside layer, said top filler means being thinner in the outer area of said top means adjacent said side wall means than in the inner area thereof to provide a convex arcuate profile to said outside layer of said top means;
   (d) a first end strap means extending from said top means downwardly to said base member across said first outer door panel of said first door member; and
   (e) a second end strap means extending from said top means downwardly to said base member across said second outer door panel of said second door member.

2. An improved collapsible, reusable shipping container being particularly usable for carrying aircraft cargo, as defined in claim 1 wherein said door opening means comprises a front door opening and a rear door opening and wherein said door means includes a front door means selectively positionable extending over said front door opening and a rear door means selectively positionable extending over said rear door opening.

3. An improved collapsible, reusable shipping container being particularly usable for carrying aircraft cargo, as defined in claim 1 wherein said first door member includes a first door crease extending vertically between said first inner door panel and said first outer door panel, said first inner door panel and said first outer door panel being pivotally movable with respect to each other therealong.

4. An improved collapsible, reusable shipping container being particularly usable for carrying aircraft cargo, as defined in claim 1 wherein said second door member includes a second door crease extending vertically between said second inner door panel and said second outer door panel, said second inner door panel and said second outer door panel being pivotally movable with respect to each other therealong.

5. An improved collapsible, reusable shipping container being particularly usable for carrying aircraft cargo, as defined in claim 1 wherein said first end strap means and said second end strap means are made of polypropylene.

6. An improved collapsible, reusable shipping container being particularly usable for carrying aircraft cargo, as defined in claim 1 wherein said first end strap means includes a selectively detachable first end strap buckle means to facilitate securement and detachment of said first end straps in position extending across said first outer door panel.

7. An improved collapsible, reusable shipping container being particularly usable for carrying aircraft cargo, as defined in claim 1 wherein said second end strap means includes a selectively detachable second end strap buckle means to facilitate securement and detachment of said second end straps in position extending across said second outer door panel.

8. An improved collapsible, reusable shipping container being particularly usable for carrying aircraft cargo, as defined in claim 1 further including moisture edge sealing means extending across the upper edges of said door means.

9. An improved collapsible, reusable shipping container being particularly usable for carrying aircraft cargo, as defined in claim 1 wherein said housing means, said door means and said top means are of paperboard material.

10. An improved collapsible, reusable shipping container being particularly usable for carrying aircraft cargo, as defined in claim 9 further including a moisture sealing coating extending across said housing means, said door means and said top means.

11. An improved collapsible, reusable shipping container being particularly usable for carrying aircraft cargo, as defined in claim 10 wherein said moisture sealing coating is a wax coating.

12. An improved collapsible, reusable shipping container being particularly usable for carrying aircraft cargo, as defined in claim 1 wherein said base member is of rigid material.

13. An improved collapsible, reusable shipping container being particularly usable for carrying aircraft cargo, as defined in claim 12 wherein said base member is of plywood material.

14. An improved collapsible, reusable shipping container being particularly usable for carrying aircraft cargo, as defined in claim 1 wherein said top means includes end flaps extending over said side wall means and said door means.

15. An improved collapsible, reusable shipping container being particularly usable for carrying aircraft cargo, as defined in claim 1 wherein said first door member is pivotally secured with respect to said side wall means.

16. An improved collapsible, reusable shipping container being particularly usable for carrying aircraft cargo, as defined in claim 1 wherein said second door member is pivotally secured with respect to said side wall means.

17. An improved collapsible, reusable shipping container being particularly usable for carrying aircraft cargo, which comprises:
(a) a housing means defining a containment chamber therein for holding articles, said housing means comprising:
  (1) a base member of rigid material comprising a floor extending generally horizontally;
  (2) a side wall means of wax-coated paperboard material extending upwardly from said base member to define inwardly facing inner wall means and defining a front door opening means and a rear door opening means;
(b) a front door means of wax-coated paperboard material positioned selectively extendable over said front door opening means and including:
  (1) a first front door member attached with respect to said side wall means adjacent said front door opening means and selectively positionable extending across at least one half thereof, said first front door member including moisture edge sealing means across the upper edges thereof, said first front door member including:
    (a) a first inner front door panel extending vertically adjacent said side wall means;
    (b) a first outer front door panel extending vertically adjacent said first inner front door panel spatially disposed from said side wall means;
    (c) a first door crease extending vertically between said first inner front door panel and said first outer front door panel, said first inner front door panel and said first outer front door panel being pivotally movable with respect to one another therealong;
  (2) a second front door member attached with respect to said side wall means adjacent said front door opening means and selectively positionable extending across the other half of said front door opening means and at least partially overlapping said first front door member, said second front door member including moisture edge sealing means across the upper edges thereof, said second front door member including:
    (a) a second inner front door panel extending vertically adjacent said side wall means;
    (b) a second outer front door panel extending vertically adjacent said first inner front door panel spatially disposed from said side wall means and at least partially overlapping said first outer front door panel;
    (c) a second door crease extending vertically between said second inner front door panel and said second outer front door panel, said second inner front door panel and said second outer front door panel being pivotally movable with respect to one another therealong;

(c) a top means of wax-coated paperboard material extending across said housing means and including:
  (1) a base layer;
  (2) an outside layer;
  (3) a top filler means positioned between said base layer and said outside layer, said top filler means being thinner in the outer area of said top means adjacent said side wall means than in the inner area thereof to provide a convex arcuate profile to said outside layer of said top means;
(d) a first front end strap means of polypropylene extending from said top means downwardly to said base member across said first outer front door panel of said first front door member, said first front end strap means including a selectively detachable first front end strap buckle means to facilitate securement and detachment of said first front end straps in position extending across said first outer front door panel;
(e) a second front end strap means of polypropylene extending from said top means downwardly to said base member across said second outer front door panel of said second front door member, said second front end strap means including a selectively detachable second front end strap buckle means to facilitate securement and detachment of said second front end straps in position extending across said second outer front door panel;
(f) a rear door means of wax-coated paperboard material positioned selectively extendable over said rear door opening means and including:
  (1) a first rear door member attached with respect to said side wall means adjacent said rear door opening means and selectively positionable extending across at least one half thereof, said first rear door member including moisture edge sealing means across the upper edges thereof, said first rear door member including:
    (a) a first inner rear door panel extending vertically adjacent said side wall means;
    (b) a first outer rear door panel extending vertically adjacent said first inner rear door panel spatially disposed from said side wall means;
    (c) a first door crease extending vertically between said first inner rear door panel and first outer rear door panel, said first inner rear door panel and said first outer rear door panel being pivotally movable with respect to one another therealong;
  (2) a second rear door member attached with respect to said side wall means adjacent said rear door opening means and selectively positionable extending across the other half of said rear door opening means and at least partially overlapping said first rear door member, said second rear door member including moisture edge sealing means across the upper edges thereof, said second rear door member including:
    (a) a second inner rear door panel extending vertically adjacent said side wall means;
    (b) a second outer rear door panel extending vertically adjacent said first inner rear door panel spatially disposed from said side wall means and at least partially overlapping said first outer rear door panel;
    (c) a second door crease extending vertically between said second inner rear door panel and said second outer rear door panel, said second inner rear door panel and said second outer rear door panel being pivotally movable with respect to one another therealong;
(g) a first rear end strap means of polypropylene extending from said top means downwardly to said base member across said first outer rear door panel of said first rear door member, said first rear end strap means including a selectively detachable first rear end strap buckle means to facilitate securement and detachment of said first rear end straps in position extending across said first outer rear door panel; and
(h) a second rear end strap means of polypropylene extending from said top means downwardly to said base member across said second outer rear door panel of said second rear door member, said second rear end strap means including a selectively detachable second rear end strap buckle means to facilitate securement and detachment of said second rear end straps in position extending across said second outer rear door panel.

* * * * *